J. H. NELSON.
LIVE BAIT TIE.
APPLICATION FILED MAY 31, 1912.

1,062,726.

Patented May 27, 1913.

Witnesses:
L. W. Cook,
Floyd A. Weahl

John H. Nelson.
INVENTOR.
By George J. Oltsch.
ATTORNEY.

UNITED STATES PATENT OFFICE.

JOHN H. NELSON, OF PORTLAND, OREGON.

LIVE-BAIT TIE.

1,062,726.   Specification of Letters Patent.   Patented May 27, 1913.

Application filed May 31, 1912. Serial No. 700,647.

*To all whom it may concern:*

Be it known that I, JOHN H. NELSON, a citizen of the United States, residing at Portland, in the county of Multnomah and State of Oregon, have invented certain new and useful Improvements in Live-Bait Ties, of which the following is a specification.

This invention relates to a bait tie for live bait fishing, and the object of the invention is to provide a tie for the purpose stated, whereby a live minnow or other live bait may be secured to a hook without injuring or killing the same, and without appreciably impairing its freedom of movement so as to be active in the water.

A further object of the invention resides in the provision of a tie for securing live bait to the hook in the most effective position, so that the point of the hook will be disposed adjacent the head of the bait and directed backwardly, so that a fish striking the bait head end first, as all game fish do, will insure the fish being hooked.

A still further object of the invention is to provide a tie for securing live bait to a hook in such a position, that the combined weight of the hook and tie will not cause the minnow or other bait used to turn bottom side up.

Other objects of the invention will be apparent from the detailed description hereinafter, when read in connection with the accompanying drawings, wherein a convenient embodiment of the invention is illustrated, and wherein like characters of reference refer to similar parts in the several views.

Figure 1:
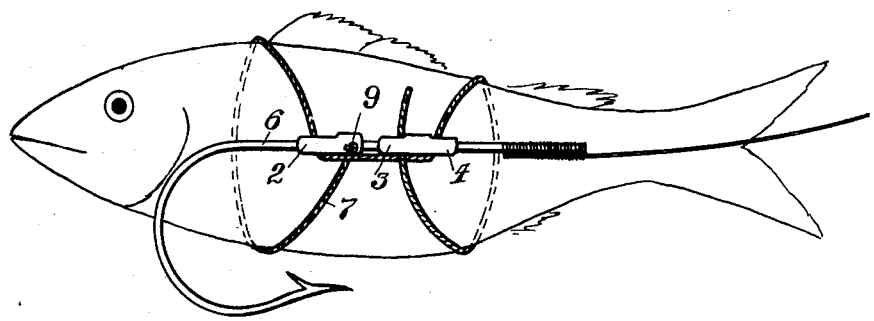
Figure 2:
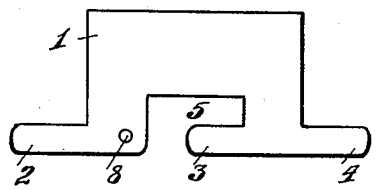
Figure 3:
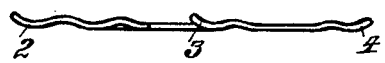
Figure 4:
Figure 5:
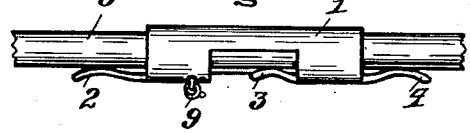

In the drawings:—Figure 1 is a side view of minnow showing the application of my invention. Fig. 2 is a plan view of the tie showing the blank from which the device is made. Fig. 3 is an edge view thereof. Fig. 4 shows the end of the tie secured to the shank of a hook, and Fig. 5 is a longitudinal view of the tie applied to the shank of a hook.

Referring now more particularly to the accompanying drawings, 1 represents a clamp plate of thin sheet-metal, provided in alinement with one longitudinal edge thereof with projecting clamp members 2, 3, and 4, the clamp member 3 being formed by an angular cut-out portion 5 as shown. The clamp plate is applied to the shank 6 of a fish hook, by bending the same around the shank, and may either be fixedly secured thereto by any suitable means, as by soldering, or the clamp member may be crimped sufficiently, as shown in Fig. 3, so as to have a tension sufficient to hold the same in frictional engagement with the hook shank to prevent same from easily shifting endwise. When applied to the hook shank the clamp members in coöperation therewith form a means for effectively clamping a line therebetween which is passed around the live bait which is to be tied to the hook. The clamp plate is positioned on the hook shank so that the clamp members thereof will be on the side of the shank opposite to the bait to be secured thereto, as plainly shown in Fig. 1, and the hook shank is preferably attached to one side of the bait so as to occupy a position centrally thereof, and with the point of the hook projecting below the bait. This manner of attachment brings the weight of the hook and line near the lower or bottom part of the bait, and prevents the bait from turning bottom side up. Furthermore the attachment of the hook to one side of the bait, especially, when a minnow is used, does not materially interfere with its freedom of motion, as the head and tail portions thereof are unhampered. Secured at one end to the clamp is a line 7, as by passing same through a hole 8 provided for the purpose, and tying a knot therein, as indicated at 9.

The operation of attaching the hook to the minnow is best practised as follows: The head end of the minnow is held between the thumb and forefinger with the left hand, and the end of the hook slipped under the thumb in position desired. With the right hand the line is then passed under and up over the back of minnow, drawing the line moderately tight in so doing, thence passing the line under the clamp 2, thence along shank of hook and under clamp 4, thence over back of minnow and down around the same, and then slipping the end under clamp 3, when the minnow and hook are securely bound together, all as plainly shown in Fig. 1.

I have thus provided an exceedingly simple and efficient tie for securing a minnow or other live bait to a hook and in a manner not to do injury to the minnow, whereby the activity and life of the same is not shortened as results by piercing some part thereof with the hook; and, furthermore, the hook may be positioned relative to the head of the minnow so as to be in the best position to hook a fish as it strikes the head end of the minnow, as all game fish do. Furthermore, by securing the hook to one side of, or on the under side of the minnow, as may be conveniently done with my tie, the weight of the hook and line will tend to hold the minnow at all times in a proper position, and prevent same from turning bottom up, as invariably results when hooking the minnow through its back or through the jaw.

Having thus described my invention, what is claimed is:—

1. In a live bait tie, the combination with a fish hook, of a sheet metal blank bent around and secured to the shank of the hook and having a plurality of alining arms the free ends of which are yielding, and a flexible tie member adapted to be looped around the bait and passed between the hook-shank and said arms to clamp the tie member against movement.

2. In a live bait tie, the combination with a fish hook, of a sheet metal blank bent around and secured to the hook-shank and having a plurality of yielding free ends which are disposed in opposite directions, and a flexible tie member adapted to be looped around the bait at different portions of its length and each loop passed between one of said arms and the hook-shank to bind the same against movement.

3. In a live bait tie, the combination with a fish hook, of means secured to the hook-shank comprising a plurality of endwise spaced arms the free ends of which are yielding, and a flexible tie member adapted to be looped around the bait at different portions of its length and each loop as made passed between a separate arm and the hook-shank to bind the tie member against movement.

4. A live bait tie for fish hooks, comprising a plate of thin sheet metal having clamping arms formed along one longitudinal edge thereof and yielding at their free ends, the end arms extending beyond the ends of the plate, and an intermediate arm formed by a cut out portion in the plate.

In testimony whereof I affix my signature in presence of two witnesses.

JOHN H. NELSON.

Witnesses:
  JOHN M. PAYNE,
  MARY PAYNE.